United States Patent
Varetti et al.

(10) Patent No.: US 11,090,728 B2
(45) Date of Patent: Aug. 17, 2021

(54) APPARATUS FOR ADDITIVE MANUFACTURING AND METHOD OF ADDITIVE MANUFACTURING

(71) Applicant: 3D NEW TECHNOLOGIES S.R.L., Rovereto (IT)

(72) Inventors: Mauro Varetti, Collegno (IT); Fabio Ferrario, Berlino (DE)

(73) Assignee: 3D New Technologies S.R.L., Rovereto (IT)

( * ) Notice: Subject to any disclaimer, the term of this patent is extended or adjusted under 35 U.S.C. 154(b) by 379 days.

(21) Appl. No.: 16/093,033

(22) PCT Filed: Apr. 13, 2017

(86) PCT No.: PCT/IB2017/052132
§ 371 (c)(1),
(2) Date: Oct. 11, 2018

(87) PCT Pub. No.: WO2017/179001
PCT Pub. Date: Oct. 19, 2017

(65) Prior Publication Data
US 2019/0176233 A1    Jun. 13, 2019

(30) Foreign Application Priority Data

Apr. 13, 2016 (IT) .................. 102016000037915

(51) Int. Cl.
*B22F 10/20* (2021.01)
*B33Y 10/00* (2015.01)
(Continued)

(52) U.S. Cl.
CPC ............ *B22F 10/20* (2021.01); *B29C 64/153* (2017.08); *B29C 64/214* (2017.08); *B33Y 10/00* (2014.12);
(Continued)

(58) Field of Classification Search
CPC .................. B29C 64/214; B33Y 50/02; B22F 2003/1057
See application file for complete search history.

(56) References Cited

U.S. PATENT DOCUMENTS

2014/0301883 A1    10/2014 Wiesner et al.
2015/0367415 A1*  12/2015 Buller ..................... B22F 3/105
                                                            419/53

FOREIGN PATENT DOCUMENTS

EP    3 170 593 A1    5/2017
WO    2014/199149 A1  12/2014

OTHER PUBLICATIONS

International Preliminary Report on Patentability dated Oct. 16, 2018, issued in PCT Application No. PCT/IB2017/052132, filed Apr. 13, 2017.

(Continued)

*Primary Examiner* — Jacob T Minskey
*Assistant Examiner* — Adrien J Bernard
(74) *Attorney, Agent, or Firm* — Workman Nydegger

(57) ABSTRACT

Apparatus for additive manufacturing includes:—a platform adapted to receive a powder bed that is laid thereon; —a laser source adapted to emit a laser beam towards the powder bed; —a first doctor blade and a second doctor blade opposite to the first doctor blade and located at a predetermined distance from said first doctor blade, the doctor blades being adapted to move in the same direction (X), so as to slide along the whole platform and define a work area, into which the laser beam is directed in order to manufacture a product; wherein the powder bed (102) is laid out by the first doctor blade, and the first doctor blade is provided with an emission opening adapted to produce a blade of a predetermined gas directed towards the powder bed, and the second doctor blade is provided with a suction opening for sucking in the gas when the product is complete, the suction opening being provided with a sensor adapted to measure the turbu- (Continued)

lence of the gas flow in the work area, so as to maintain, through a control unit, a laminar flow between the emission opening and the suction opening.

12 Claims, 2 Drawing Sheets

(51) Int. Cl.
*B33Y 30/00* (2015.01)
*B33Y 50/02* (2015.01)
*B29C 64/153* (2017.01)
*B29C 64/214* (2017.01)
*B22F 10/30* (2021.01)

(52) U.S. Cl.
CPC ............... *B33Y 30/00* (2014.12); *B33Y 50/02* (2014.12); *B22F 10/30* (2021.01); *Y02P 10/25* (2015.11)

(56) References Cited

OTHER PUBLICATIONS

International Search Report and Written Opinion dated Jul. 25, 2017, issued in PCT Application No. PCT/IB2017/052132, filed Apr. 13, 2017.

\* cited by examiner

APPARATUS FOR ADDITIVE MANUFACTURING AND METHOD OF ADDITIVE MANUFACTURING

BACKGROUND OF THE INVENTION

1. The Field of the Invention

The present invention relates to an apparatus for additive manufacturing and to a method of operation thereof for the purpose of executing an additive manufacturing process.

2. The Relevant Technology

The term additive manufacturing refers to a process wherein three-dimensional design data are used for manufacturing a component by progressively laying out multiple layers of material. Additive manufacturing is a production technique that is clearly distinct from conventional methods based on material removal: instead of producing a semifinished product by starting from a solid block or by filling a mould in a single step, as is typical in foundries, components are built layer by layer starting from materials available as fine powder. Different types of materials can be used, in particular metals, plastics or composite components.

The process is started by laying a thin layer of powder material onto a work platform (bed). A laser beam is then used in order to melt the powder exactly in predefined locations according to the component design data. The platform is then lowered and another layer of powder is applied, and the material is melted again in order to bind it to the underlying layer in the predefined locations.

FIG. 1 shows an apparatus for additive manufacturing 1 according to the prior art.

Such apparatus comprises a laser source, associated optics for transmitting a beam, and scanner optics, designated as a whole by reference numeral 2, which are adapted to emit a laser beam 4 directed towards a powder bed 6.

The powder bed 6 is fed by a powder dispenser piston 6a, which feeds the powder, in a feed area 7, onto a platform 6b. The dispenser piston 6a moves vertically upwards along a direction A as the powder is used.

A doctor blade 8 moves transversally relative to the platform 6b in a direction B parallel to the plane in which the powder bed 6 lies, thus moving the powder from the feed area 7 towards a work area 10, wherein the laser beam 4 progressively creates a product 12 by melting the powder layer just laid by the doctor blade 8. In the work area 10 there are also a platform 6b', whereon the powder brought by the doctor blade 8 is laid, and a support piston 6a', which lowers vertically in a direction C as the product 12 takes shape and increases in size.

In the work area 10 an emission opening and an opposite suction opening (not shown in the figure) are advantageously present, which are arranged transversal to the powder bed 6 and parallel to the plane in which a powder bed lies, for introducing a blade of a predefined gas, e.g., argon, and for sucking it in, respectively. The gas is used for cleaning the work area 10 from the vapours produced by evaporation of the powder; such vapours must not, in fact, be allowed to re-condense on the product 12, because this would lead to processing defects.

The apparatus of FIG. 1 is a static system that cannot easily grow in size for manufacturing big parts; as the dimensions of the product 12 increase, the dimensions of the emission opening and suction opening should also increase accordingly, but, if an excessively large gas blade is emitted, the gas will produce turbulences on the surface of the powder bed 6 that will not allow for optimal processing, since they will impair the uniformity and homogeneity of the powder bed 6 (dune effect). An increase in the size of the product 12 would necessarily require higher speed values of the gas blade between the openings in order to clean the work area 10, resulting in a higher Reynolds number and in the presence of turbulent motion. Thus, a part of the powder on the bed 6 would be dragged away by the gas blade, resulting in excessive material waste. The presence of turbulence in the gas blade would inevitably imply the generation of vortices and the loss of planarity in the previously laid powder bed, with adverse consequences on the manufactured part.

In order to maintain a laminar gas blade (e.g., Re<2000), the blade speed should be decreased, resulting in adverse effects in terms of productivity of the system and contamination of the generated part.

Moreover, in the apparatus of FIG. 1 it is necessary, due to the fact that the laser source 2 is in a fixed position, that the doctor blade 8 completes the deposition of the powder bed 6 onto the platform 6b' before the source 2 can be turned on and production of the product 12 can be started. Therefore, there are many intervals between one step and the next, which limit the productivity of the system because it is necessary to wait for the completion of the laying of a new powder bed before starting a new processing step.

Likewise, a damaged component will cause a long downtime.

Penetration and absorption of the laser beam in the powder bed are defined by the interaction between the laser beam itself and the powder bed, in particular by the energy absorption properties and the temperature of the powder bed.

The absorption properties of the material include density, thermal conductivity, specific heat and emissivity. These properties do not have constant values, but change with the temperature of the material. In particular, according to an additive manufacturing technique called selective laser sintering/melting, thermal capacity (the product of specific heat by the temperature difference between ambient temperature and melting temperature) can widely affect the process.

The actual thermal capacity of the powder depends on its apparent density, which takes into account the gaps between one grain and the neighbouring ones, and on the temperature difference between the process start temperature and the melting temperature. While specific heat and apparent density are predefined as a function of the type of powder material in use and cannot be changed by the process, it is very important to be able to control the temperature range close to the melting point.

In addition to the above, it must be reminded that the quality of the manufactured parts is strongly dependent on the choice of the process parameters, such as laser power, laser scanning speed on the powder bed, shape of the laser beam, and material in use.

In the field of direct laser manufacturing or selective laser melting, one very important parameter is process speed, i.e., productivity. By optimizing this parameter it is possible to expand the application range of laser machines to spheres normally covered by foundries, while however offering several advantages, such as high spatial resolution, capillary process control, and capability of pre-processing the powder bed and post-processing the melted material.

Such advantages add to all the traditional advantages of additive manufacturing, such as the possibility of creating structures that cannot be manufactured in foundries.

Today, the above-described apparatuses for additive manufacturing allow the execution of a process that is articulated as follows:
- properly levelling the plate (platform 6b) whereon the powder bed 6 lies, in manual way, only at the beginning of the process;
- moving the doctor blade 8, which mechanically lays out the powder bed 6;
- melting the layer of powder bed 6 by means of a galvanic scanner for laser processing;
- laying out, by means of the doctor blade 8, a new powder bed 6 in the opposite direction, or by restarting the cycle.

The vapours produced by evaporation of elements of the material are sucked in by an inert gas blade tangential to the powder bed 6, produced by a suction opening in a fixed position.

A detailed analysis of the total length of an additive manufacturing process allows identifying four times:
1. the time necessary for laying out the bed of material to be melted;
2. the time necessary for positioning the laser beam (galvanic scanner);
3. the time necessary for the material to melt;
4. the time necessary for resetting the process for processing the next layer.

An apparatus for additive manufacturing as described above requires the consecutive execution of all the process steps, and its duration cannot therefore be reduced.

SUMMARY OF THE INVENTION

It is therefore one object of the present invention to propose an apparatus for additive manufacturing which allows reducing the total processing time and eliminating any air turbulences that may develop when manufacturing big parts, thus increasing overall productivity.

It is a further object of the present invention to propose an innovative method of additive manufacturing.

These and other objects are achieved through an apparatus for additive manufacturing having the features set out in the independent claims.

Particular embodiments of the invention are set out in dependent claims, the contents of which are intended to be an integral part of the present description.

BRIEF DESCRIPTION OF THE DRAWINGS

Further features and advantages of the invention will be illustrated in the following detailed description, which is provided merely by way of non-limiting example with reference to the annexed drawings, wherein.

DETAILED DESCRIPTION OF THE PREFERRED EMBODIMENTS

Figure 1:
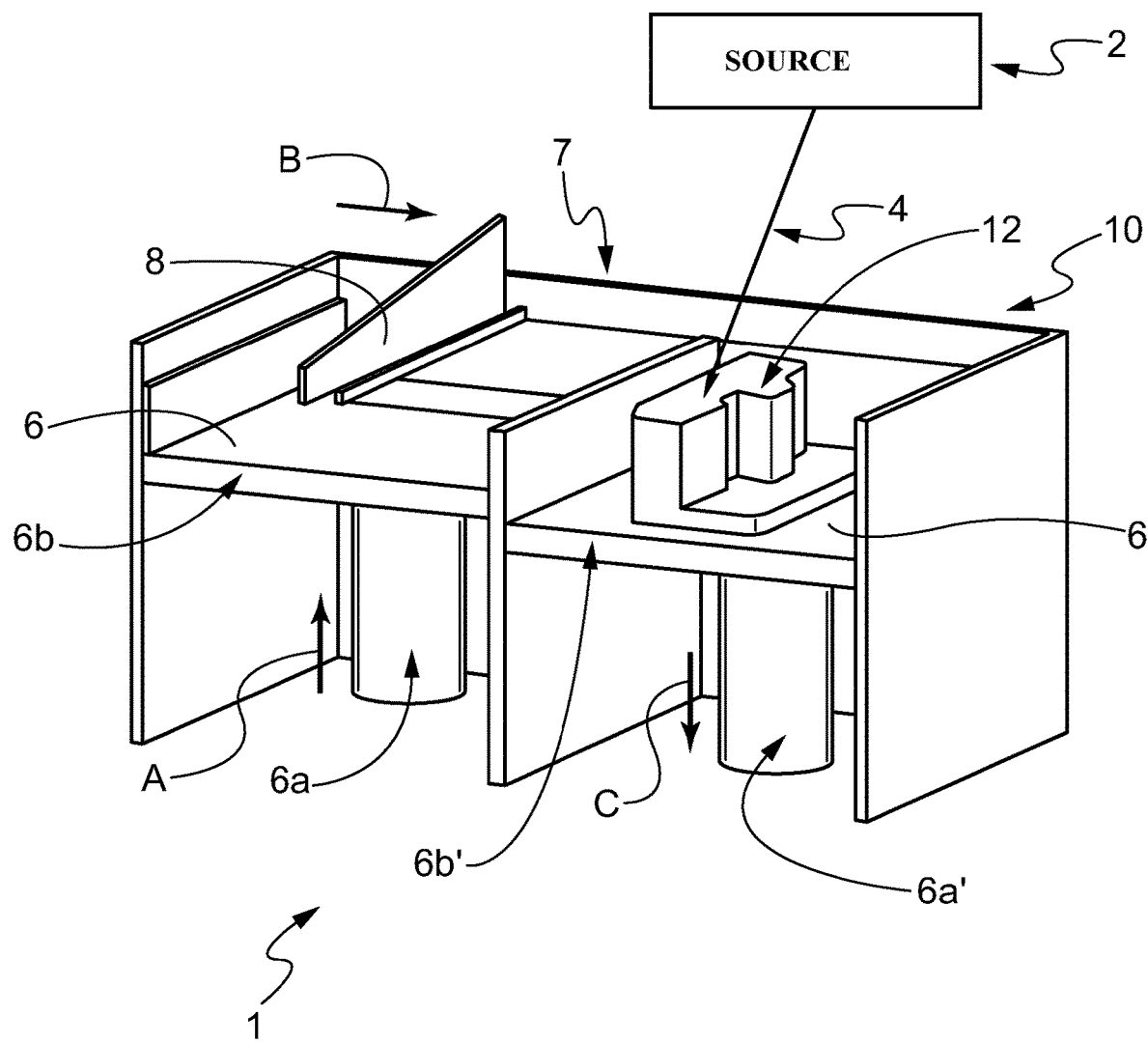
FIG. 1, already described, shows an apparatus for additive manufacturing according to the prior art.
Figure 2:
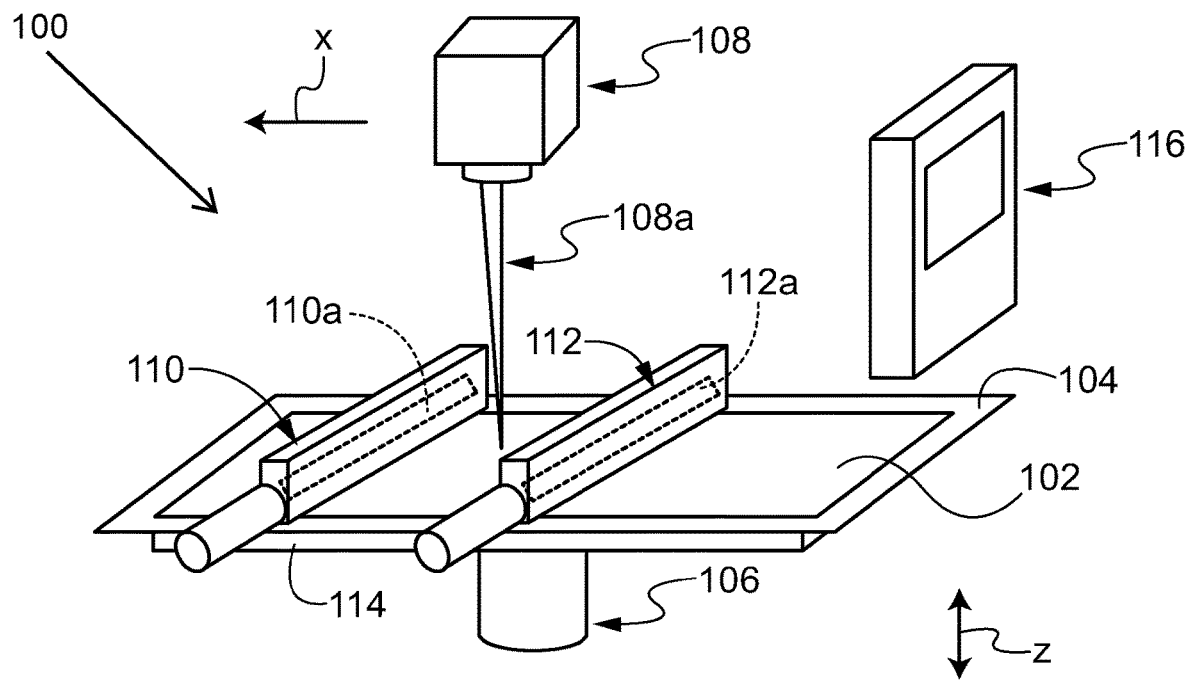
FIG. 2 shows an apparatus for additive manufacturing according to the present invention.

FIG. 2 shows an apparatus for additive manufacturing 100 according to the present invention.

It comprises a powder bed 102 laid horizontally on a platform 104, preferably rectangular in shape, supported by a piston 106 adapted to move, in a per se known manner, vertically along a vertical direction Z, so as to move said platform 104 along the direction Z.

The apparatus 100 further comprises a scanner head 108. A fixed laser source is connected to it or integrated into it in a per se known manner, which is adapted to emit a laser beam 108a directed towards the powder bed 102.

A first doctor blade 110 and a second doctor blade 112 are arranged on the powder bed 102, opposite to each other at a constant and predefined distance.

Between the two doctor blades 110, 112 a work area 114 is defined, wherein the desired product is manufactured; therefore, the laser beam 108a is specifically directed into said work area 114.

Both doctor blades 110 and 112 are adapted to move in the same direction X and to slide along the entire platform 104 (on the powder bed 102).

In particular, the powder bed 102 is laid out by the first doctor blade 110 (because it precedes the second doctor blades 112 in the direction of motion X). Alternatively, the doctor blades 110, 112 may move in a direction opposite to the direction X, in which case the powder bed 102 will be laid out by the second doctor blade 112.

The doctor blades 110, 112 are provided with an emission opening 110a and a suction opening 112a, respectively, which are adapted to output and take in a blade of processing gas, such as, for example, argon or nitrogen. In this manner, delivery and suction of the processing gas will occur on opposite sides, and the work area 114 will always be properly covered with gas, thus eliminating the notorious "dune effect".

In addition, sensor means (not shown in the figure) are provided on the suction opening 112a for measuring the turbulence in the work area 114. It will thus be possible to maintain, by means of an electronic control unit 116 controlling the gas speed, a laminar flow between the two openings 110a, 112a.

Moreover, the short distance between the two openings 110a, 112a allows using high speed values (Re≈2000) while still maintaining a laminar flow, thereby increasing the productivity of the system and the quality of the manufactured parts. If the openings were kept at a fixed distance equal to the size of the powder bed 102, on the contrary, it would be necessary to adopt much lower speeds to maintain a laminar flow.

The active control over the laminarity of the gas blade ensures planarity of the powder bed throughout the processing effected by the laser on the deposited layer. This makes it possible to attain growth uniformity along the axis z of the part, thus keeping the powder bed planar, while also ensuring high purity of the manufactured part by avoiding any inclusion caused by residues or carbonized particles, which can be effectively removed by a high-speed flow.

The laser beam 108a follows the doctor blade 110, 112 that is laying the powder layer to be melted, and laser melting occurs during the deposition of the powder onto the powder bed 102, resulting in higher efficiency of the whole process.

The first doctor blade 110, which precedes the second doctor blade 112 along the direction of motion X, blows said blade of nitrogen/argon, while the second doctor blades 112 sucks it in; when the first doctor blade 110 reaches a terminal transversal edge of the platform 104, the motion of the doctor blades 110 and 112 is reversed and the two doctor blades start moving in a direction opposite to the first direction X. As soon as the direction of motion X is reversed, also the roles of the openings are exchanged, so that there will be, respectively, an emission opening 112a on the second doctor blade 112 and a suction opening 110a on the first doctor blade 110. As an alternative, the roles of the opening may not be reversed.

Proximity sensors, preferably of the capacitive or optical type, are associated with the doctor blades 110, 112 for controlling the distance between the doctor blades 110, 112 and the powder bed.

A control unit 116 is connected to the apparatus 100 in order to control the movements of the doctor blades 110, 112 and of the source 108 and to control the operation of the apparatus 100.

Figure 3:
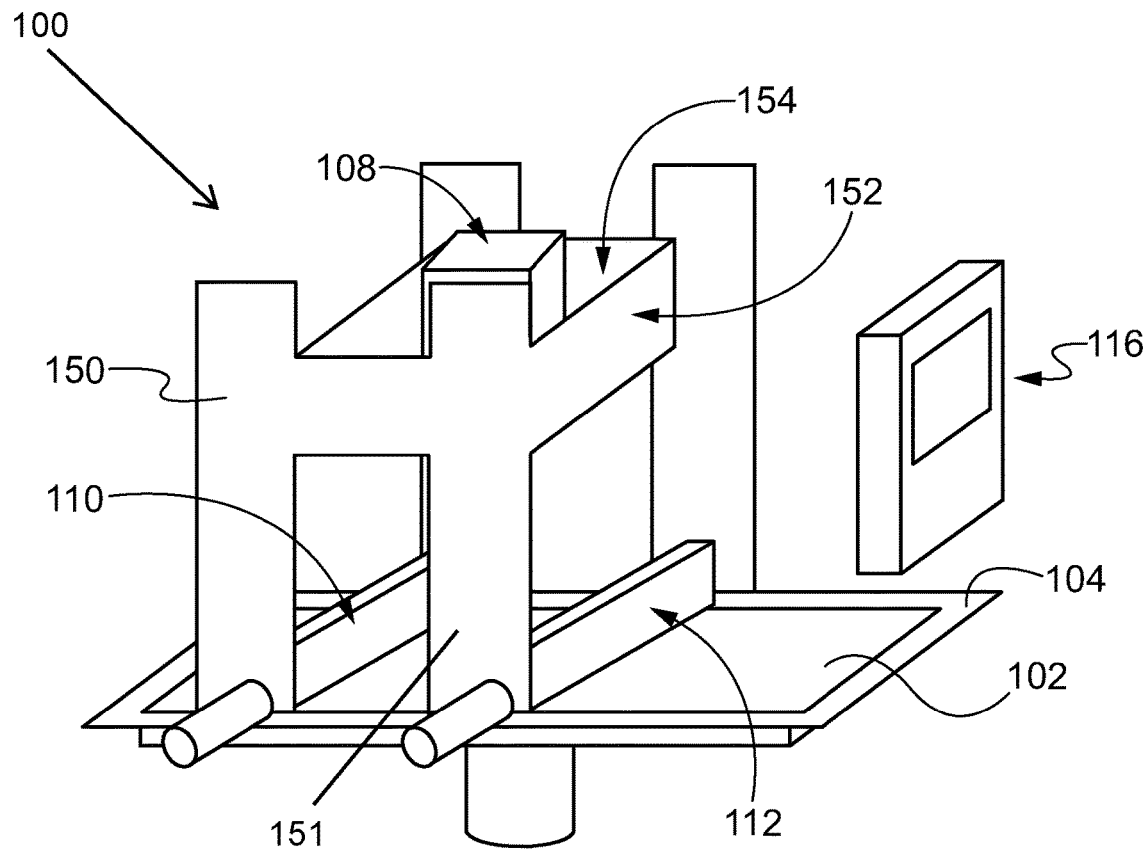
FIG. 3 shows a variant of the apparatus of FIG. 2.

FIG. 3 shows a variant of the apparatus of FIG. 2, wherein the doctor blades 110, 112 are secured to the base of a portal 150 comprising columns 151 and transversal elements 152 fixed between the columns 151. The scanner head 108 that directs the beam 108a is positioned in a housing 154 defined by said transversal elements 152.

The method of additive manufacturing according to the present invention is therefore based on the use of the apparatus 100 and comprises the steps of:
- providing an apparatus 100 as previously described;
- dragging the doctor blades 110, 112 horizontally on the powder bed 102 in a direction X, up to the terminal transversal edge of the platform 104;
- progressively activating the scanner head 108 as the doctor blades 110, 112 move in order to manufacture the product 12, so as to direct the laser beam 108a coming from said source 108 into a work area 114 between said doctor blades 110, 112;
- when the terminal transversal edge of the platform 104 is arrived at, turning off the source connected to the scanner head 108 and stopping the motion of the doctor blades 110, 112;
- dragging again the doctor blades 110, 112 horizontally on the powder bed 102 in the direction opposite to the previous one;
- progressively activating the source connected to the scanner head 108 again as the doctor blades 110, 112 move.

Thanks to the use of the two doctor blades 110, 112, the apparatus of the present invention allows reducing the time necessary for laying out the bed of material to be melted, because the laying step overlaps to a large extent with the melting step, as opposed to such steps occurring sequentially as in the reference case.

The time required for positioning the laser beam 108a can be divided into two distinct times: the time necessary for moving the beam 108a during the processing, when the source is on, and the positioning time, when the source connected to the scanner head 108 is off.

The laser source 108 is only active in the work area 108a, while the doctor blades 110, 112 are moving and laying out the material. In this manner, the process time is only determined by the melting speed, without being affected by the time necessary for depositing the material onto the powder bed 102.

The melting time is inversely proportional to the laser power; therefore, a further reduction in the process time can be easily obtained by using more powerful lasers.

The apparatus for additive manufacturing equipped with two doctor blades as described herein allows reducing the fourth process time, i.e., the time necessary for resetting the system for processing the next layer.

The symmetrical arrangement of the two doctor blades 110, 112 makes them usable in both directions, thus completely zeroing the reset time and making it possible to lay out the powder bed 102 in both directions.

The configuration with two symmetrical, self-moving doctor blades 110, 112 also allows accommodating the inert-gas ventilation system for evacuating the melting vapours, which might contaminate, by re-condensing, both the powder and the surface just melted.

This function is provided by the fixed emission and suction openings, together with the delimited work area 114: the ventilation system moves along with the doctor blades 110, 112 due to the mutual vicinity of the two doctor blades 110, 112, and requires much less coverage gas while at the same time ensuring higher uniformity with a lower gas flow rate.

This also has a positive effect on the heating and melting of the powder and on the next cooling of the melted layer, contributing to removing less heat by convection and improving in this way the thermal balance of the area where laser processing occurs.

Thanks to the use of the two openings 110a, 112a positioned at a fixed distance, shorter than the size of the platform 104, a laminar gas blade can be maintained.

It is thus possible to adopt higher gas blade speeds, thereby advantageously preserving the purity of the powder and of the manufactured part, while also considerably shortening the production times. Furthermore, due to the sensor means used for measuring the turbulence of the gas blade, it is possible to verify the presence of a laminar flow in the work area 114, thus ensuring that a homogeneous product will be obtained.

Of course, without prejudice to the principle of the invention, the embodiments and the implementation details may be extensively varied from those described and illustrated herein by way of non-limiting example, without however departing from the protection scope of the present invention as set out in the appended claims.

The invention claimed is:
1. An apparatus for additive manufacturing, comprising:
a platform adapted to receive a powder bed that is laid thereon;
a fixed laser source adapted to emit a laser beam towards the powder bed;
a first doctor blade and a second doctor blade opposite to the first doctor blade and located at a predetermined distance from said first doctor blade, said doctor blades being adapted to move in the same direction (X), so as to slide along the whole platform and define a work area, into which the laser beam is directed in order to manufacture a product;
wherein during use the powder bed is laid out by the first doctor blade, the first doctor blade being provided with an emission opening formed directly thereon that is adapted to produce a blade of a predetermined gas directed towards the powder bed, and the second doctor blade being provided with a suction opening formed directly thereon for sucking in said gas, said suction opening being provided with sensor means adapted to measure a turbulence of a gas flow of the gas in said work area, so as to maintain, by means of a control unit, a laminar flow between said emission opening and said suction opening.
2. The apparatus according to claim 1, wherein said doctor blades are adapted to reverse their direction of motion (X), so as to move in a direction opposite to said direction of motion as soon as the first doctor blade has reached a terminal transversal edge of the platform.

3. The apparatus according to claim 2, wherein the second doctor blade produces a gas blade towards the powder bed, and the first doctor blade sucks in said gas when the product is complete.

4. The apparatus according to claim 1, wherein the laser beam manufactures a product by melting the powder of the powder bed as the first doctor blade deposits the powder onto the powder bed.

5. The apparatus according to claim 1, wherein the doctor blades are secured to the base of a portal comprising columns and transversal elements fixed between the columns, wherein the laser source is positioned in a housing defined by said transversal elements.

6. The apparatus according to claim 1, wherein the platform is supported by a piston adapted to move vertically.

7. The apparatus according to claim 1, wherein said control unit is further adapted to control to movements of the doctor blades.

8. The apparatus according to claim 1, wherein the distance between said emission opening and said suction opening is fixed.

9. A method of additive manufacturing, comprising the steps of:
providing an apparatus according to claim 1;
dragging the doctor blades horizontally on the powder bed in a direction (X), up to the terminal transversal edge of the platform;
progressively activating the laser source as the doctor blades move in order to manufacture the product, so as to direct the laser beam coming from said source into a work area between said doctor blades;
when the terminal transversal edge of the platform is arrived at, turning off the source and stopping the motion of the doctor blades;
dragging again the doctor blades horizontally on the powder bed in the direction opposite to the previous one;
progressively activating the source again as the doctor blades move.

10. The method of additive manufacturing according to claim 9, wherein the speed of the gas blade is controlled in such a way as to maximize the removal of processing residues and prevent any turbulence from arising in said work area.

11. A method for operating the apparatus for additive manufacturing as recited in claim 1, the method comprising:
dragging the first doctor blade and the second doctor blade horizontally directly on the powder bed;
producing the blade of the predetermined gas through the emission opening formed directly on the first doctor blade so that the blade of the predetermined gas is directed towards the powder bed in the work area; and
sucking the produced gas into the suction opening formed directly on the second doctor blade.

12. The method as recited in claim 11, further comprising:
using the sensor means associated with the suction opening of the second doctor blade to measure a turbulence of the gas flowing in the work area; and
using the control unit to maintain a laminar flow of the gas between the emission opening and the suction opening.

* * * * *